United States Patent [19]
Winslow

[11] Patent Number: 6,164,972
[45] Date of Patent: Dec. 26, 2000

[54] EDUCATIONAL DOLL

[76] Inventor: Andrew R. Winslow, 1230 NW. 21st Ave., Apt. #209, Portland, Oreg. 97209

[21] Appl. No.: 09/216,891

[22] Filed: Dec. 18, 1998

[51] Int. Cl.[7] .................................................. G09B 19/00
[52] U.S. Cl. ...................... 434/219; 434/226; 434/234; 434/365; 446/85; 446/97; 446/98; 446/101; 446/268; 446/397
[58] Field of Search .................................. 434/219, 226, 434/234, 256, 257, 185, 365; D21/634, 635, 636, 637; 446/295, 296, 297, 397, 268, 85, 97, 98, 101

[56] References Cited

U.S. PATENT DOCUMENTS

| D. 257,590 | 12/1980 | Jackson | D21/177 |
|---|---|---|---|
| D. 309,334 | 7/1990 | Italiano, Jr. | D21/178 |
| D. 384,709 | 10/1997 | McCabe | D21/177 |
| D. 398,667 | 9/1998 | Crowden | D21/178 |
| 3,593,433 | 7/1971 | Dillon . | |
| 5,096,424 | 3/1992 | Carlberg | 434/262 |
| 5,474,484 | 12/1995 | Lemelle | 446/142 |
| 5,607,336 | 3/1997 | Lebensfeld et al. | 446/297 |
| 5,807,112 | 9/1998 | Zeck | 434/127 |
| 5,816,821 | 10/1998 | Ouellette | 434/157 |

*Primary Examiner*—Kien T. Nguyen
*Assistant Examiner*—Bena B. Miller
*Attorney, Agent, or Firm*—Ingrid McTaggart

[57] ABSTRACT

An educational doll or action figure comprises the professional attire, tools and safety gear of a particular profession so as to give a child a hands-on learning experience regarding the requirements, responsibility and hazards involved in carrying out the profession. The educational doll or action figure preferably also includes a written, schematic and/or multimedia description of the attire, tools and safety gear of the profession so as to further the general knowledge of the child about the particular profession. The clothing, tools, safety gear and written description may be sold separately from the doll figure so as to allow the child to dress a single doll in a variety of professions.

20 Claims, 7 Drawing Sheets

EDUCATIONAL DOLL

TECHNICAL FIELD

The present invention relates to an educational doll, and more particularly, to an educational doll or action figure for use in teaching children about a variety of professions and the tools and safety gear involved in carrying out such professions.

BACKGROUND OF THE INVENTION

Dolls and action figures have long been popular with children throughout the world. Initially, dolls and action figures were created as a companion or friend for children so as to create a sense of security by allowing the child to easily identify with the doll. These dolls and action figures typically have childlike physical features such as immature facial features and proportions. The dolls may also be clothed in a manner familiar to children such as in pajamas and play clothes. Furthermore, these dolls typically are sold with the accessories of a baby such as doll sized rattles and baby bottles.

With the increased awareness of child psychology and development, dolls and action figures have taken on an educational role. For example, dolls and action figures may be sold with the physical features, hair and clothing of a teenager or an adult so as to allow the child to play the role of a teenager or adult through use of the doll or action figure. Such role playing allows the child to place themselves in adult situations thereby allowing for the mental development of the child. Heretofore, a disadvantage of these prior art dolls and action figures is that the clothing sold with the dolls is generally limited to glamorous female clothes or military male clothes. Moreover, the accessories sold with the dolls are generally limited to personal hygiene products or military weaponry. Accordingly, these dolls generally limit the child's imagination to a few stereotypical adult roles.

Accordingly, there is a need for a doll or action figure that stimulates the imagination of a child by allowing the child to play the role of an adult in a variety of adult situations or professions. Moreover, there is a need for a doll or action figure that allows the child to learn about the tools and safety gear of a variety of these professions so as to further understand the responsibility of carrying out such a profession.

SUMMARY OF THE INVENTION

Accordingly, an object of the present invention is to provide an educational doll or action figure that stimulates the imagination of a child.

Another object of the present invention is to provide an educational doll or action figure that allows the child to play the role of an adult through use of the doll.

Still another object of the present invention is to provide an educational doll or action figure for use in teaching children about a variety of professions.

Yet another object of the present invention is to provide an educational doll or action figure for use in teaching children about the tools and safety gear involved in carrying out a variety of professions.

Accordingly, the present invention provides an educational doll or action figure that is sold with the professional attire, tools and safety gear of a particular profession so as to teach a child about the particular profession and the responsibility involved in carrying out the profession. Moreover, in the preferred embodiment, the educational doll or action figure is sold with a written or schematic description of the tools and safety gear so as to further the general knowledge of the child about the particular profession.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
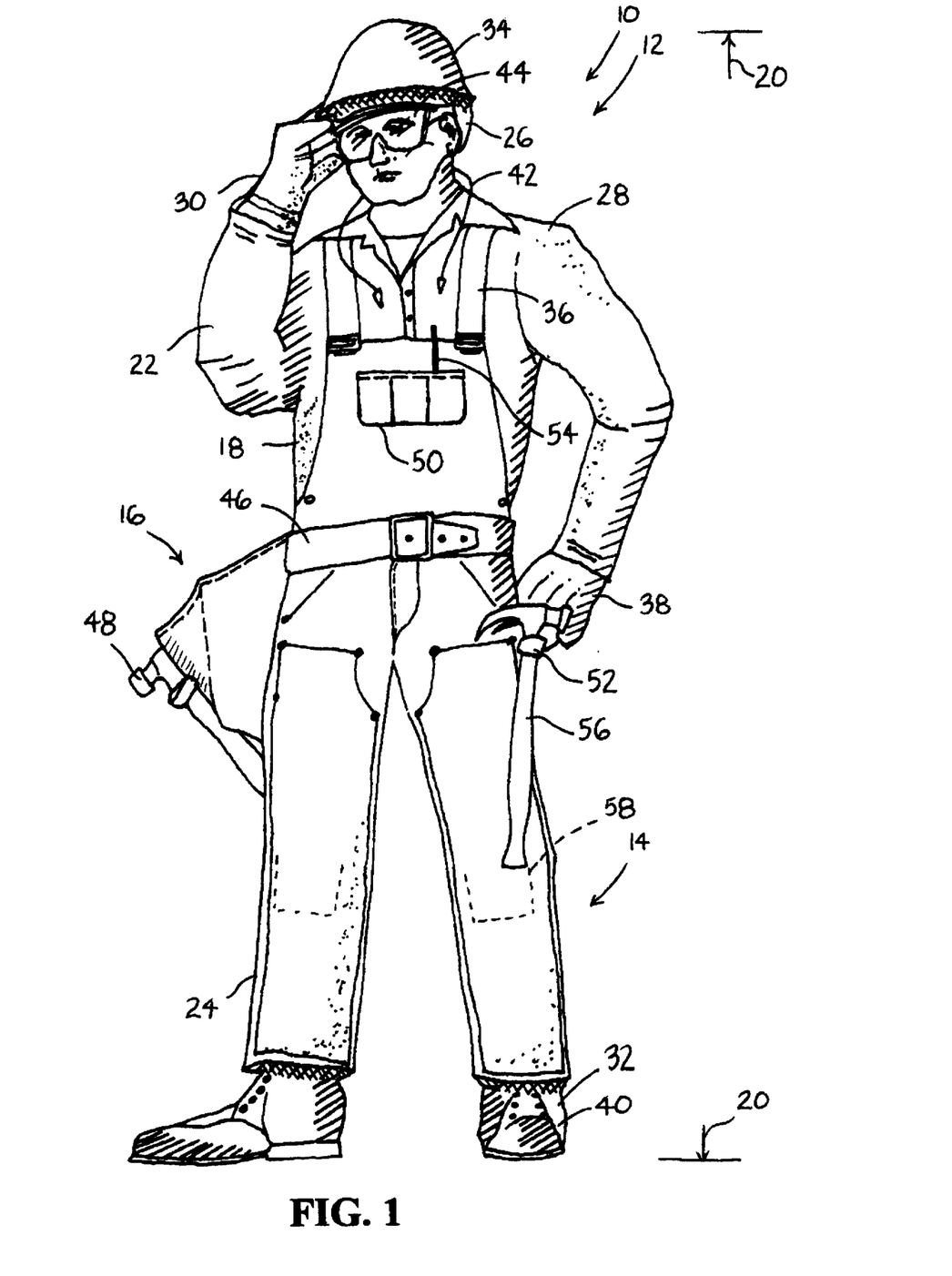
FIG. 1 is a front view of the preferred embodiment of the educational doll or action figure showing the attire, tools and safety gear of a construction worker.

Referring to FIG. 1, which is a front view of the preferred embodiment of the educational doll or action figure showing the attire, tools and safety gear of a construction worker, educational doll 10 comprises a doll or action FIG. 12 clothed in the professional attire 14 and tools and safety gear 16 of a construction worker. Doll 12 typically comprises a body 18 manufactured of plastic and having a height 20 of approximately eighteen inches (in) (45.2 centimeters (cm)). Doll 12 typically has the proportions of an adult male human figure, but in other embodiments may have the proportions of an adult female human figure. In one embodiment the doll is manufactured as a Caucasian approximately 30 years in age, but may also be manufactured to represent any ethnic background or age.

In the preferred embodiment, body 18 includes arms 22, legs 24, and a head 26 that are movable with respect to a torso 28 of the doll. Doll 12 may also comprise hands 30 and feet 32 that move with respect to arms 22 and legs 24, respectively. In this embodiment, tools and safety gear 16 of the doll may be manipulated by a child through use of the doll, as will be described below, so as to allow the child to realistically play the role of the particular profession.

Professional attire 14 and tools and safety gear 16 of construction worker doll 12 typically comprise a hardhat 34, overalls 36, gloves 38 and steel toe boots 40. Educational doll 10 may further include earplugs 42, safety glasses 44, and a tool belt 46 including tools 48 held therein. Earplugs 42 may comprise individual earplugs attached together by a string or earplugs connected by a rigid headband. Safety glasses 44 may comprise thick safety rimmed glasses or face shielding plastic goggles. Hardhat 34, for the construction worker doll, is colored yellow, as is standard in the construction industry. Overalls 36 may be mustard colored and shaped as is standard in the industry. Moreover, overalls 36 may comprise a variety of pockets 50 and loops 52 to hold tools such as a construction pencil 54 and a first hammer 56, respectively. The overalls may also comprise kneepad pockets 58 positioned within the knees of the overalls to hold kneepads within the overalls. Steel toe boots 40 typically are brown in color and have a hard toe region, as is standard for an actual construction worker. As will be understood by one skilled in the art, the tools and safety gear of the educational doll typically will be manufactured of rigid plastic but will have the external shape and texture of the tools and safety gear of an actual professional, so as to suggest the actual manufacturing materials of the tools and gear of the actual professional.

Figure 2:
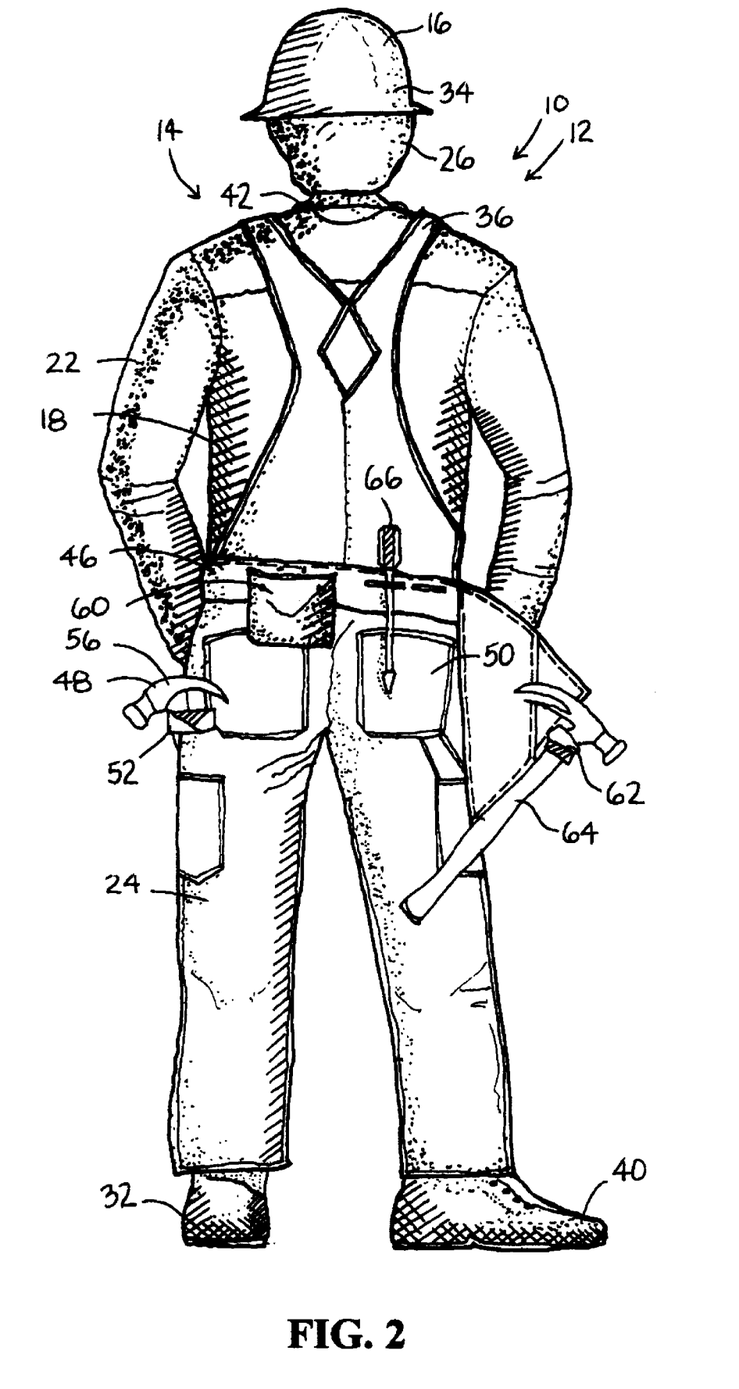
FIG. 2 is a rear view of the preferred embodiment of the educational doll or action figure of FIG. 1.

Referring to FIG. 2, which is a rear view of the preferred embodiment of the educational doll or action figure of FIG. 1, tool belt 46 typically is manufactured of plastic and has an external surface texture to simulate a genuine leather tool belt. The belt typically has pockets 60 and loops 62 for holding a variety of tools and safety gear common in the construction industry. For example, tool belt 46 may hold a second hammer 64 or a flathead screwdriver 66. The tool belt may be manufactured of resilient but somewhat flexible plastic, or may comprise a working buckle, so that the child is able to remove the tool belt from doll 12 during play. Moreover, tools and safety gear 16 generally will be individually removable from tool belt 46 so that the child can remove and inspect each individual tool and piece of safety gear.

In the preferred embodiment, doll 12 may include larger tools such as a shovel, a pick and a jackhammer (not shown). As will be understood by those skilled in the art, models of even larger tools, such as table saws and forklifts, may also be sold together with or separate from doll 12 so as to further educate the child regarding the requirements and daily operation of a particular profession.

Figure 3:
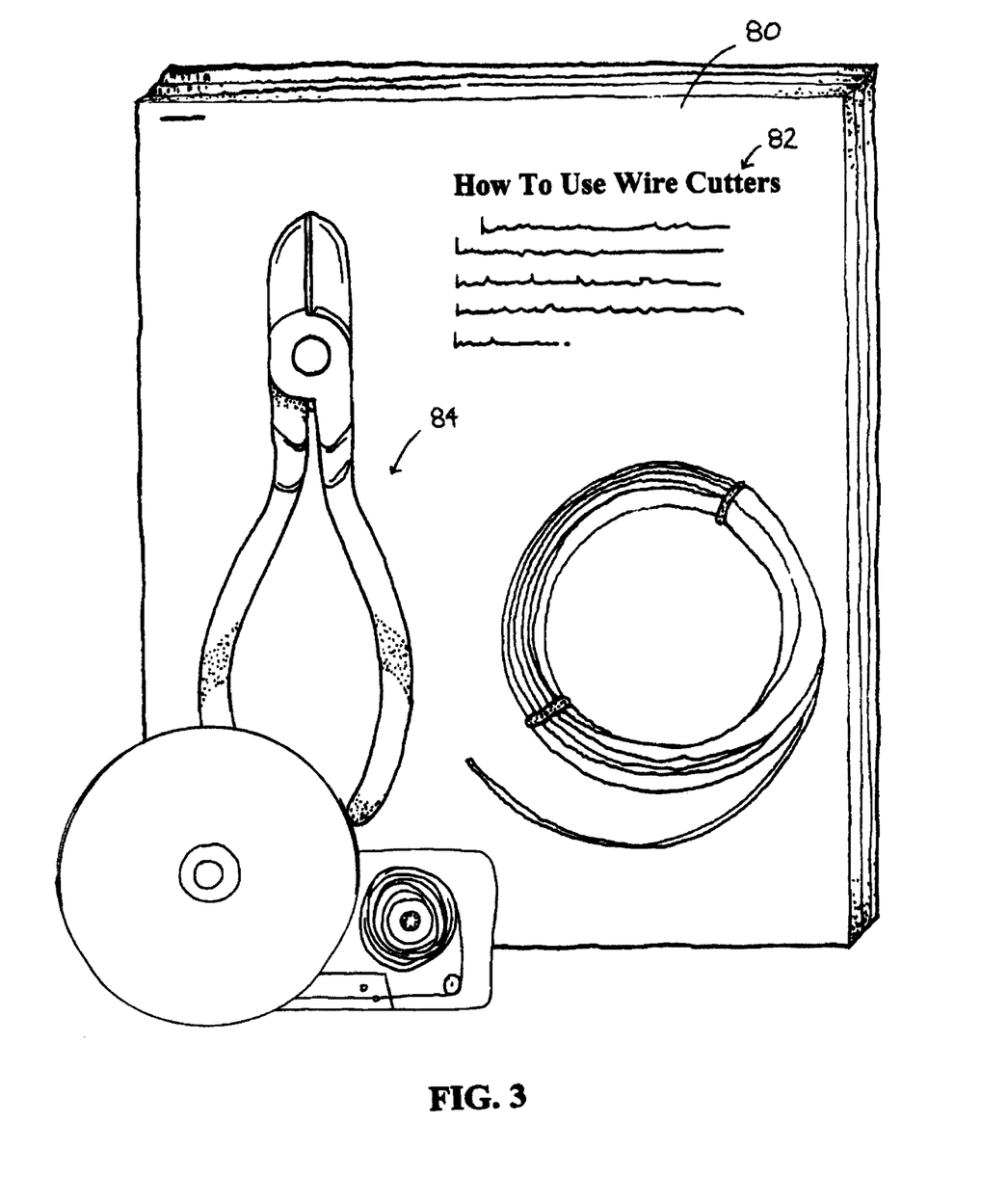
FIG. 3 is a front view of an informational packet corresponding to the preferred embodiment of the educational doll or action figure of FIG. 1 including a description of the tools and safety gear of a construction worker.

Referring to FIG. 3, which is a front view of the informational packet corresponding to the preferred embodiment of the educational doll or action figure of FIG. 1 showing a description of the tools and safety gear of a construction worker, packet 80 preferably includes multiple sheets including schematic diagrams showing professional clothing 14 and each of tools and safety gear 16. Specifically, the schematic diagrams typically will show how each of the overalls, tool belt, hard hat, gloves, earplugs, safety glasses and steel toe boots are worn by a construction worker, and how each of the individual tools is held within and removed from tool belt 46. For example, the sheets may give visual instructions to the child as to how the belt is positioned on the doll and which side of the belt should face forwardly. The sheets may also show how the hardhat is worn and how it may be adjusted for a variety of different sized people.

In the preferred embodiment, the sheets will give a written and/or visual description of the safety features of the tools and safety gear of doll 10. Specifically, the sheets may give descriptive warnings explaining the dangers of not wearing the safety goggles, hard hat and steel toe boots. The sheets preferably will also explain how each of the tools is used. For example, the sheet may give a written and/or visual description of how a screwdriver is used to fasten or loosen screws or bolts, how a nail is hammered into a piece of wood, how the pick is used to dig a hole, and how the jackhammer is used to break up a block of cement. In other embodiments, wherein larger tools such as models of table saws and forklifts are sold for use with doll 10, the general use of these larger tools may also be shown. On the front page of the packet as shown, the top sheet gives a written description 82 and a visual description 84 regarding the use of wire and a pair of wire cutters.

In another embodiment, packet 80 may comprise an audio tape or a multimedia compact diskette (shown in FIG. 3) that gives an audio explanation and/or visual representation of an actual construction worker. For example, the audio tape may give an audible description of each of the clothing, tools and safety gear of the doll, along with how each piece is used and the safety features of each item. The multimedia compact diskette may also give an audio and a visual representation of an actual construction worker showing the worker conducting actual construction or physical labor tasks. The multimedia compact diskette may also include tasks and example play exercises for the child to role play so as to allow the child to further understand and identify with the particular professional being represented by the doll. Those skilled in the art will understand that the informational sheet may comprise a portion of the packaging, may be sold as a separate printed sheet, tape or diskette, or may comprise any combination thereof.

In this manner, the child's imagination is stimulated by allowing the child to play the role of an adult while learning about a variety of professions. This combination of a doll with professionally appropriate clothing and simulated tools and safety gear, together with an audio and/or a visual explanation of the use and safety features of each of the items, is thought to be an effective learning tool for the child. Moreover, the doll may be purchased to coincide with the gender and ethnic background of the child thereby further facilitating the child to visualize them self in the role of a particular profession. Such visualization is believed to lead to increased self esteem and confidence of the child.

Figure 4:
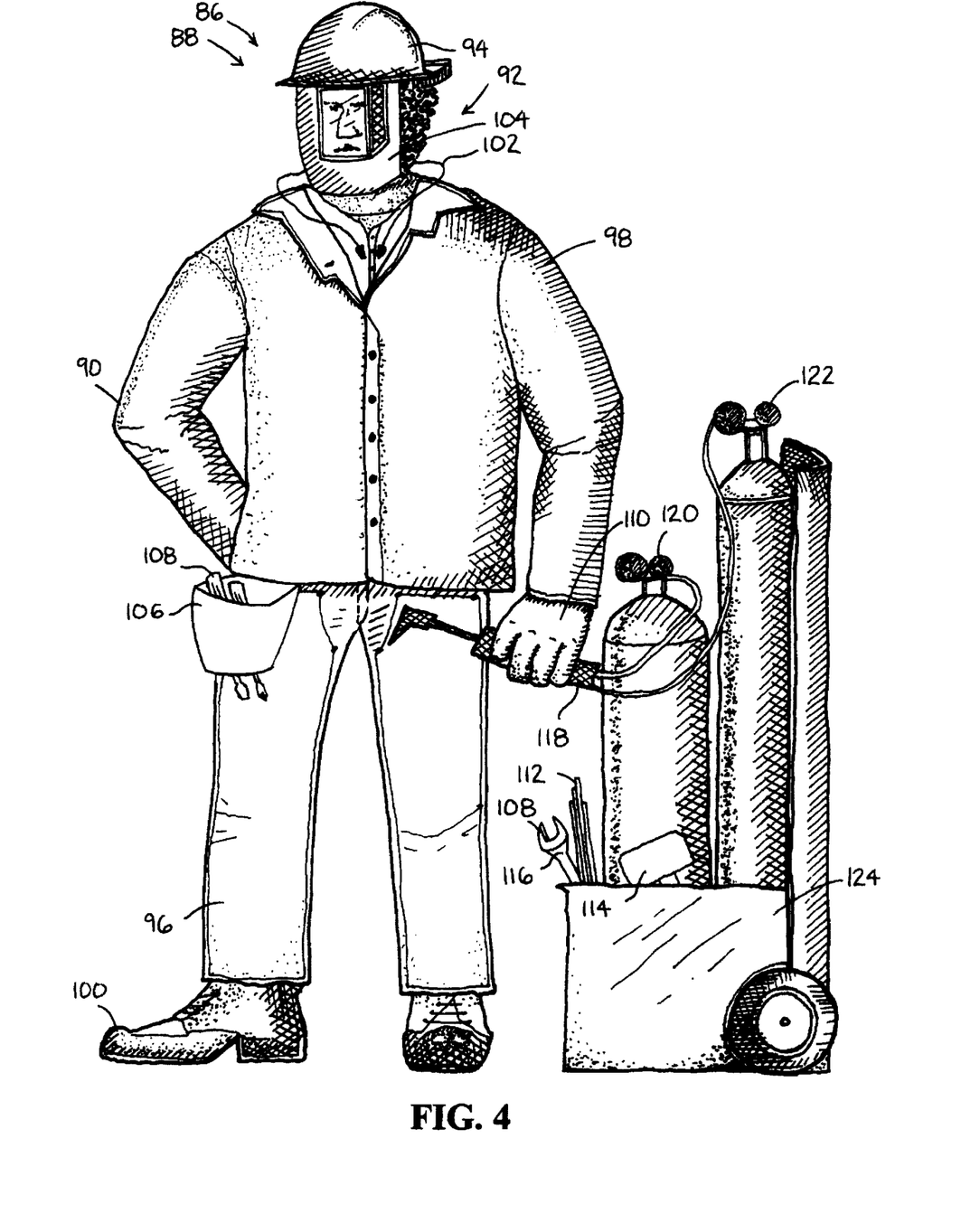
FIG. 4 is a front view of another embodiment of the educational doll or action figure showing the attire, tools and safety gear of an iron worker.

Referring to FIG. 4, which is a front view of another embodiment of the educational doll or action figure showing the attire, tools and safety gear of an iron worker, doll 86 comprises a doll or action FIG. 88 clothed in the professional attire 90 and tools and safety gear 92 of an iron worker. In this embodiment, doll 86 is manufactured as an African American male approximately 30 years in age.

Professional attire 90 and tools and safety gear 92 of iron worker doll 86 typically comprise a hardhat 94, overalls 96, a welding jacket 98, and steel toe boots 100. Educational doll 86 may further include earplugs 102, a welding mask 104, and a tool belt 106 including tools 108 held therein. Welding mask 104 may comprise a transparent face shield attached to a head band or attached directly to hardhat 94. Hardhat 94 typically will be colored dark brown, as is standard in the iron worker industry. Welding jacket 98 typically will have a texture that suggests the jacket is manufactured of smooth leather or suede, which would provide protection for an actual iron worker against burning by sparks created during welding, similar to the welding jacket of an actual professional iron worker. Gloves 110 typically will extend up to or beyond the elbow of doll 86, similar to the protective gloves of an actual iron worker. Tools 108 typically comprise welding rods 112, a hammer 114, a large open ended wrench 116, also called a box wrench, and a welding torch 118. Iron worker doll 86 may also comprise model acetylene and oxygen tanks 120 and 122, respectively, positioned on a model wheeled cart 124, wherein the model tanks are connected to model welding torch 118.

Iron worker doll 86 further comprises an information packet (similar to that shown in FIG. 3) that describes the safety features of the attire, tools and safety gear of the iron worker doll. For example, the information packet may include sheets that explain the general job description of an iron worker, use of the welding torch, and the safety features of the welding mask, jacket and gloves. In this manner a child will understand the responsibilities of and the daily skills used by an iron worker. In another embodiment, the information sheet may comprise an audio tape or a multimedia compact diskette which gives an audio and/or visual description of an iron worker conducting the actual duties of the profession.

Figure 5:
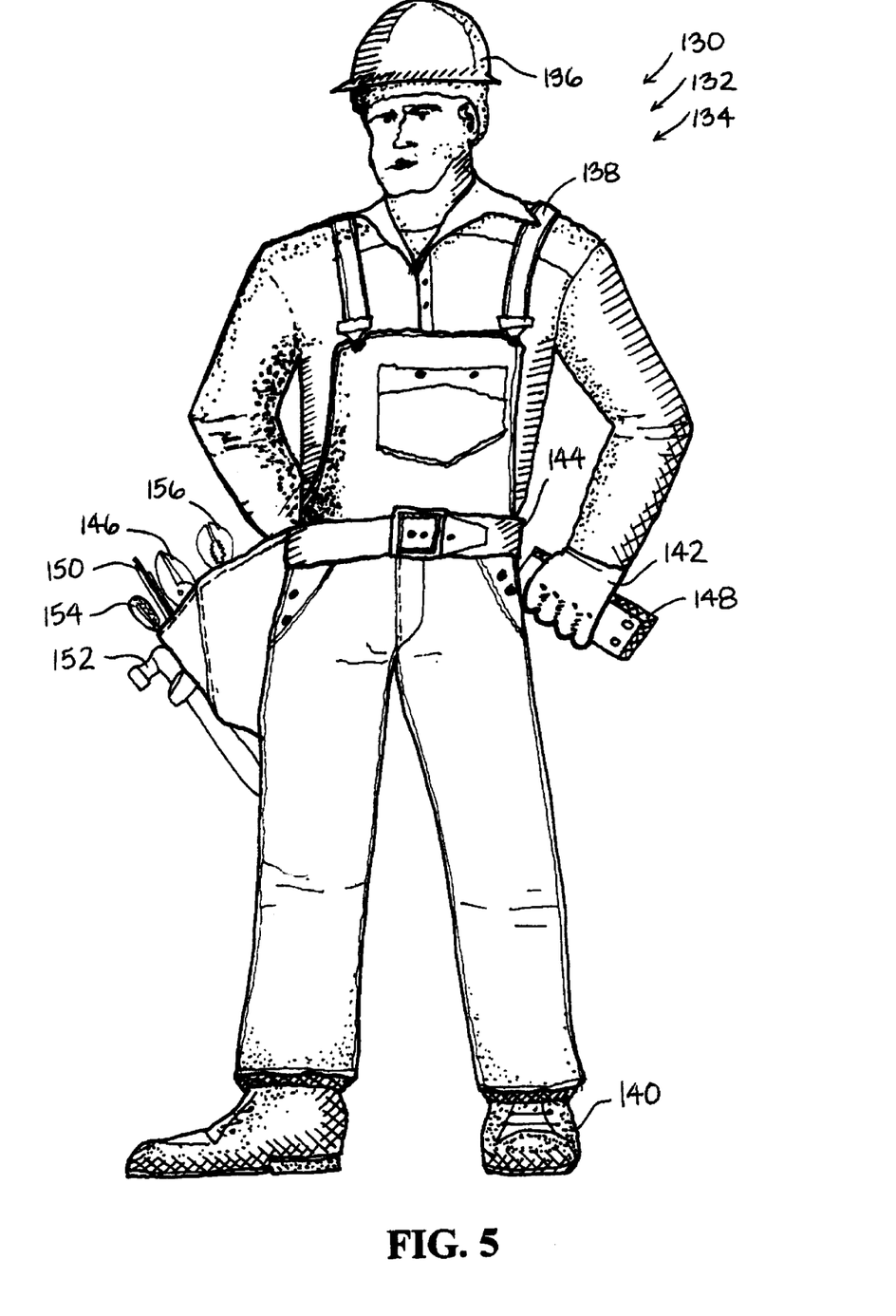
FIG. 5 is a front view of another embodiment of the educational doll or action figure showing the attire, tools and safety gear of an electrician.

Referring to FIG. 5, which is a front view of another embodiment of the educational doll or action figure showing the attire, tools and safety gear of an electrician, doll 130 comprises a doll or action figure clothed in the attire 132 and the tools and safety gear 134 of an electrician. Attire 132 and tools and safety gear 134 of electrician doll 130 typically comprise a white colored hard hat 136, as is standard in the industry, blue overalls 138, brown work boots 140, gloves 142 and a tool belt 144. Model work boots 140 typically will be manufactured of rigid plastic and will simulate leather work boots without a steel toe insert, as is standard in the industry. Tool belt 144 will include tools such as wire strippers 146, a voltage tester 148, color coded wire pieces 150, a hammer 152, a screwdriver 154, and pliers 156.

Doll 130 will further comprise an informational packet (not shown) that describes the profession of an electrician. For example, the packet may describe use of the wire cutters, the significance of a white colored hard hat, and the color makings on the wire samples. Specifically, the packet may explain that black, red and blue wires indicate a low voltage rating of approximately 120 volts to 208 volts, whereas brown, orange, and yellow wires indicate a high voltage rating of approximately 277 volts to 400 volts. The informational packet, which may comprise a sheet, sheets, a tape, a diskette, packaging, or any combination thereof, may also explain the safety features of nonconductive boots and the purpose of insulation around each individual wire.

Figure 6:
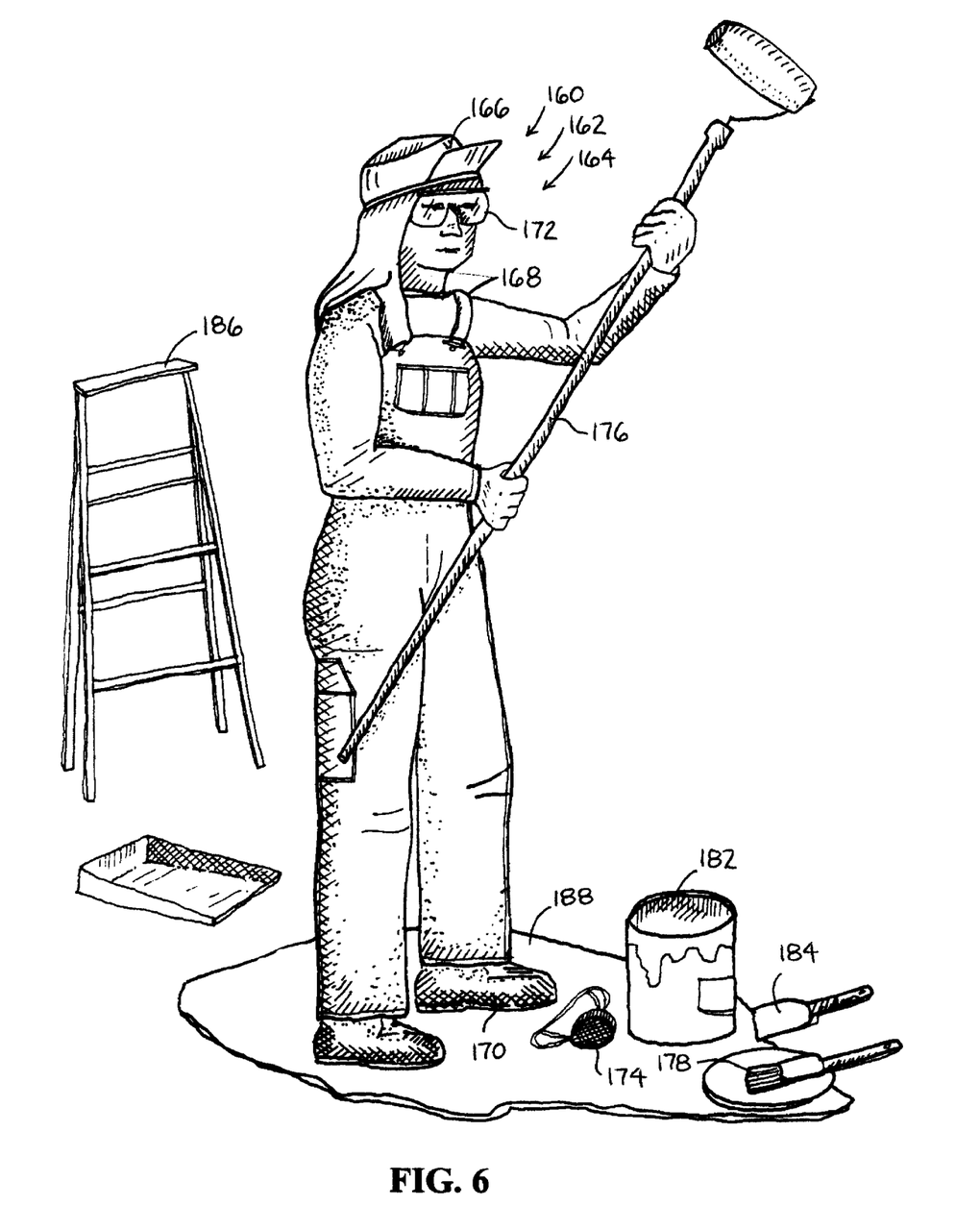
FIG. 6 is a front view of another embodiment of the educational doll or action figure showing the attire, tools and safety gear of a painter.

Referring to FIG. 6, which is a front view of another embodiment of the educational doll or action figure showing the attire, tools and safety gear of a painter, doll 160 comprises the attire 162 and the tools and safety gear 164 of a painter. Attire 162 and tools and safety gear 164 typically will comprise a painting hat 166, white overalls 168, work boots 170, goggles 172 and a respirator 174. The tools and safety gear may further comprise a paint roller 176, a paint brush 178, a paint sprayer (not shown), a can of paint 182, and a paint scraper 184. Doll 160 may also include larger tools such as a ladder 186, a tarp 188 (a portion thereof being shown) and a power washer (not shown).

Similar to the other embodiments, doll 160 will include an information packet explaining the job carried out by a painter and the safety features of the various attire, tools and safety gear. For example, the packet may include an explanation of the use of the respirator, a visual warning showing the potential danger to the painter's eyes if goggles are not worn, and a description of the use of the paint sprayer.

Figure 7:
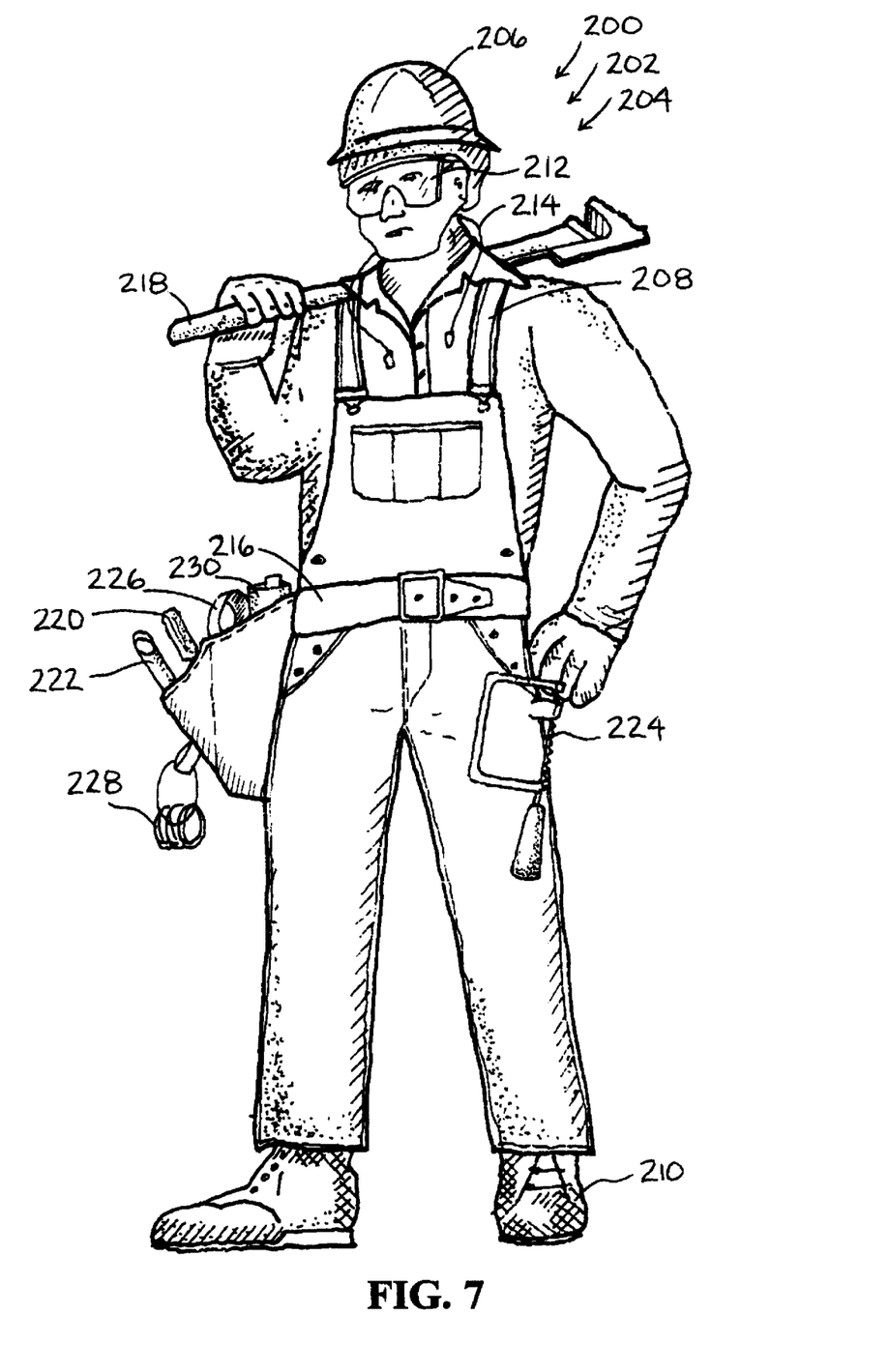
FIG. 7 is a front view of another embodiment of the educational doll or action figure showing the attire, tools and safety gear of a plumber.

Referring to FIG. 7, which is a front view of another embodiment of the educational doll or action figure showing the attire, tools and safety gear of a plumber, doll 200 comprises the attire 202 and the tools and safety gear 204 of a plumber. Attire 202 and tools and safety gear 204 typically will comprise a red or an orange hard hat 206, blue overalls 208, steel toe boots 210, goggles 212, earplugs 214, and a tool belt 216. Tool belt 216 typically holds therein a pipe wrench 218, a screwdriver 220, a striker 222 for igniting a spark, a pipe cutter 224, plumbing tape 226, washers 228 and a can of ABS cement 230. Doll 200 may further comprise larger tools such as a model propane bottle or a model plumbers snake (not shown). In the preferred embodiment, doll 200 further comprises an informational packet (similar to that shown in FIG. 3) that describes the skills carried out by a plumber and the safety features of the tools involved in the daily work of a plumber.

In other embodiments, the educational doll or action figure may be attired in the clothing, tools and safety gear of a variety of professions, such as a doctor, a nurse, a policewoman, or the like. In addition, the clothing, tools, safety gear and informational packet for a particular profession may be sold separately from a doll so that the child need only purchase one doll and thereafter place the doll in a variety of professional situations.

In each of these embodiments, the doll will include an audio and/or a visual description of the work carried out by the professional and a description of the safety features of the tools and safety gear for the profession. Accordingly, by use of the doll and the informational packet of the present invention a child receives a hands-on introduction to a profession together with a written or multimedia description of the requirements, responsibilities and hazards of the particular profession. This combination of learning techniques enables an enhanced retention of the knowledge gained by the child, which is believed to increase the development and self-esteem of the child. Those skilled in the art will understand that the informational packet may comprise a portion of the packaging of the doll or may comprise a book sold with the education doll.

While preferred embodiments of the present invention have been shown and described, it will be apparent to those skilled in the art that many changes and modifications may be made without departing from the invention in its broader aspects. The appended claims are intended to cover, therefore, all such changes and modifications as fall within the true spirit and scope of the invention.

I claim:

1. An educational doll comprising:
   a body shaped to simulate a human figure;
   a clothing set adapted to be worn on said body and structured to simulate a predetermined profession;
   a play tool and safety gear set adapted to be used with said body and structured to simulate actual tools and safety gear used by working professionals in said predetermined profession; and
   information means separate from said body and including a visual image of actual tools and safety gear used by working professionals and a visual description of the use of said actual tools and the safety features of said actual safety gear as used by said working professionals in said predetermined profession wherein the visual image of the actual tools and safety gear corresponds to the play tool and safety gear set.

2. The educational doll of claim 1 wherein said clothing set is structured to simulate the clothes of a construction worker and wherein said play tool and safety gear set is structured to simulate actual tools and safety gear used by a construction worker.

3. The educational doll of claim 2 wherein said clothing set includes overall, knees pads, simulated steel toe boots, and a tool belt.

4. The educational doll of claim 2 wherein said play tool and safety gear set includes a yellow colored hardhat, safety glasses, a shovel, and a pick.

5. The educational doll of claim 4 wherein said information means includes a description of the hazards associated with non use of said safety glasses, and a description of the use of said shovel and said pick.

6. The educational doll of claim 1 wherein said predetermined profession is chosen from the group consisting of a construction worker, an iron worker, an electrician, a painter, and a plumber.

7. The educational doll of claim 1 wherein said predetermined profession is chosen from the group consisting of a doctor, a nurse, and a policeman.

8. The educational doll of claim 1 wherein said visual image comprises a schematic diagram.

9. The educational doll of claim 1 wherein said information means further includes an audio tape.

10. The educational doll of claim 1 wherein said information means comprises a multimedia compact diskette.

11. An educational action figure comprising:
   a doll structured to simulate an adult human figure;
   clothing structured to be worn by said doll and having an appearance that simulates a particular profession;
   a play tool and safety gear set structured to be used with said doll and having an appearance that simulates selected actual tools and safety gear of said particular profession; and
   an informational packet separate from said body and including a visual description of said clothing and said play tool and safety gear set and a printed description that describes the correct usage and safety features of actual tools and safety gear used in said particular profession wherein the actual tools and safety gear described in said informational packet correspond to the play tool and safety gear set so as to allow a child to play the role of said particular profession by manipulation of said action figure and said play tool and safety gear set.

12. The educational action figure of claim 11 wherein said printed description comprises a written description.

13. The educational action figure of claim 11 wherein said informational packet further includes an audio tape.

14. The educational action figure of claim 11 wherein said informational packet comprises a multimedia compact diskette.

15. The educational action figure of claim 11 wherein said particular profession is chosen from the group consisting of a construction worker, an iron worker, an electrician, a painter, and a plumber.

16. The educational action figure of claim 11 wherein said particular profession is chosen from the group consisting of a doctor, a nurse, and a policeman.

17. The educational action figure of claim 11 wherein said clothing comprises overalls, boots and a tool belt.

18. The educational action figure of claim 11 wherein said tool and safety gear set comprises a yellow colored hardhat, safety glasses, a shovel, and a pick.

19. The educational action figure of claim 11 wherein said informational packet includes a visual description of the hazards associated with nonuse of a pair of safety glasses.

20. An educational play set comprising:
   clothing structured to be worn by a doll and having an appearance that simulates a particular profession;
   a play tool and safety gear set structured to be used with said clothing and having an appearance that simulates selected tools and safety gear of said particular profession; and
   an informational packet separate from said play tool and safety gear set, said packet including a printed description of said clothing and a printed description of the correct use and safety features of an actual tool and safety gear set, wherein said printed description of said actual tool and safety gear set corresponds to the play tool and safety gear set and facilitates manipulation of said play tool and safety gear set so as to allow a child to play the role of said particular profession.

\* \* \* \* \*